US011093279B2

(12) United States Patent
Glikson et al.

(10) Patent No.: US 11,093,279 B2
(45) Date of Patent: Aug. 17, 2021

(54) RESOURCES PROVISIONING BASED ON A SET OF DISCRETE CONFIGURATIONS

(71) Applicant: International Business Machines Corporation, Armonk, NY (US)

(72) Inventors: Alex Glikson, Haifa (IL); Giovanni Toffetti-Carughi, Como (IT); Bazarbek Uatay, Astana (KZ)

(73) Assignee: International Business Machines Corporation, Armonk, NY (US)

( * ) Notice: Subject to any disclaimer, the term of this patent is extended or adjusted under 35 U.S.C. 154(b) by 570 days.

(21) Appl. No.: 14/298,981

(22) Filed: Jun. 9, 2014

(65) Prior Publication Data

US 2015/0355892 A1 Dec. 10, 2015

(51) Int. Cl.
*G06F 9/455* (2018.01)
*G06F 9/48* (2006.01)
(Continued)

(52) U.S. Cl.
CPC ........ *G06F 9/4856* (2013.01); *G06F 9/45558* (2013.01); *G06F 9/5027* (2013.01); *G06F 9/546* (2013.01); *G06F 2009/4557* (2013.01)

(58) Field of Classification Search
CPC ............. G06F 9/45558; G06F 9/45533; G06F 9/5094; G06F 9/5005
See application file for complete search history.

(56) References Cited

U.S. PATENT DOCUMENTS 8,261,266 B2  9/2012  Robert
8,261,268 B1 *  9/2012  Forgette .............. G06F 9/45558
                                                          718/1
(Continued)

FOREIGN PATENT DOCUMENTS

CN  102946413 A  *  2/2013
EP     2592550 B1      4/2015
(Continued)

OTHER PUBLICATIONS

Beloglazov et al., "Energy-aware resource allocation heuristics for efficient management of data centers for cloud computing," Future Generation Computier Systems, vol. 28, issue 5, May 2012, pp. 755-768.

(Continued)

*Primary Examiner* — Wei Y Zhen
*Assistant Examiner* — Brahim Bourzik
(74) *Attorney, Agent, or Firm* — Reza Sarbakhsh (57) ABSTRACT

Machines, systems and methods for deploying virtual machines (VMs), the method comprises maintaining N message queues corresponding to N VM flavors, wherein the N VM flavors are associated with N distinguishable configuration requirements for supporting placement of at least a first VM on at least a first host with limited resources; wherein a first host from among a plurality of hosts subscribes to a first message queue from among the N message queues, in response to determining that the first host has the resources that match the respective configuration requirements for supporting the first VM placed on the first message queue; receiving a VM placement request for the first VM, wherein the VM placement request comprises information indicating a first VM flavor associated with a first message queue; communicating arrival of the VM request to one or more hosts subscribing to the first message queue.

20 Claims, 5 Drawing Sheets

(51) Int. Cl.
  *G06F 9/445* (2018.01)
  *G06F 9/54* (2006.01)
  *G06F 9/50* (2006.01)

(56) References Cited

U.S. PATENT DOCUMENTS

| | | | |
|---|---|---|---|
| 8,458,717 B1 | 6/2013 | Keagy et al. | |
| 2007/0271560 A1 | 11/2007 | Wahlert et al. | |
| 2008/0134175 A1* | 6/2008 | Fitzgerald | G06F 21/53 |
| | | | 718/1 |
| 2012/0102183 A1 | 4/2012 | Murakami et al. | |
| 2012/0324070 A1 | 12/2012 | Campion | |
| 2014/0282520 A1* | 9/2014 | Sabharwal | G06F 9/455 |
| | | | 718/1 |
| 2015/0242234 A1* | 8/2015 | Harris | G06F 9/45558 |
| | | | 718/1 |
| 2015/0347264 A1* | 12/2015 | Mohammed | H04L 67/10 |
| | | | 714/45 |
| 2017/0034198 A1* | 2/2017 | Powers | H04L 63/20 |
| 2019/0188022 A1* | 6/2019 | Jung | G06F 9/45558 |

FOREIGN PATENT DOCUMENTS

| | | |
|---|---|---|
| TW | 2013/24187 A | 6/2013 |
| WO | 2013068194 A1 | 5/2013 |

OTHER PUBLICATIONS

Gulati et al., "Vmware distributed resource management: design, implementation, and lessons learned," VMware Technical Journal, vol. 1, No. 1, Spring 2012.

Stillwell et al., "Resource allocation algorithms for virtualized service hosting platforms," Journal of Parallel Distributed Computing, vol. 70, No. 9, pp. 962-974, Sep. 2010.

Speitkamp et al., "A mathematical programming approach for server consolidation problems in virtualized data centers," IEEE Transactions on Services Computing, vol. 3, issue 4, pp. 266-278, 2010.

Cardosa et al., "Shares and utilities based power consolidation in virtualized server environments," IFIP/IEEE International Symposium on Integrated Network Management—IM '09, Jun. 2009, pp. 327-334.

Hyser et al., "Autonomic virtual machine placement in the data center," HP Laboratories, Tech. Rep. HPL-2007-189, Feb. 2008.

Keller et al., "An analysis of first fit heuristics for the virtual machine relocation problem," Network and service management (cnsm), 2012 8th international conference and 2012 workshop on systems virtualiztion management (svm), Oct. 2012, pp. 406-413.

Feller et al., "A case for fully decentralized dynamic vm consolidation in clouds," 2012 IEEE 4th International Conference on Cloud Computing Technology and Science (CloudCom), Dec. 2012, pp. 26-33.

Yazir et al., "Dynamic resource allocation in computing clouds using distributed multiple criteria decision analysis," 2010 IEEE 3rd International Conference on Cloud Computing (CLOUD), Jul. 2010, pp. 91-98.

Buyya et al. "Optimal online deterministic algorithms and adaptive heuristics for energy and performance efficient dynamic consolidation of virtual machines in cloud data centers," Concurrency and computation: Practice and Experience, vol. 24 Issue 13, Sep. 2012, pp. 1397-1420.

Jayasinghe et al., "Improving Performance and Availability of Services Hosted on IAAS Clouds With Structural Constraint—Aware Virtual Machine Placement.", 2011 IEEE International Conference on Services Computing (SCC), Jul. 2011, pp. 72-79.

Shi et al., "Optimal Placement of Virtual Machines With Different Placement Constraints in IAAS Clouds", Symposium on ICT and Energy Efficiency and Workshop on Information Theory and Security (CIICT 2012), Jul. 2012, pp. 35-40.

Beloglazov, et al., "Optimal Online Deterministic Algorithms and Adaptive Heuristics for Energy and Performance Efficient Dynamic Consolidation of Virtual Machines in Cloud Data Centers," Concurrency and Computation: Practice and Experience, 2012 [accessed on Feb. 18, 2021], 24 pages, vol. 24, Wiley InterScience, DOI: 10.1002/cpe.1867. Retrieved from the Internet: <URL: http://www.cloudbus.org/papers/Optimal-VM-Consolidation-CCPE2012. pdf.

Open Stack, "Compute," OpenStack Docs [online], [accessed on Feb. 18, 2021], 8 pages, Retrieved from the Internet: <URL: https://docs.openstack.org/nova/latest/admin/>.

\* cited by examiner

RESOURCES PROVISIONING BASED ON A SET OF DISCRETE CONFIGURATIONS

COPYRIGHT & TRADEMARK NOTICES

A portion of the disclosure of this patent document may contain material, which is subject to copyright protection. The owner has no objection to the facsimile reproduction by any one of the patent document or the patent disclosure, as it appears in the Patent and Trademark Office patent file or records, but otherwise reserves all copyrights whatsoever.

Certain marks referenced herein may be common law or registered trademarks of the applicant, the assignee or third parties affiliated or unaffiliated with the applicant or the assignee. Use of these marks is for providing an enabling disclosure by way of example and shall not be construed to exclusively limit the scope of the disclosed subject matter to material associated with such marks.

TECHNICAL FIELD

The disclosed subject matter relates generally to virtual machine placement and, more particularly, to managing placement and provisioning of virtual machines in a computational environment based on a set of discrete configurations.

BACKGROUND

The assignment of a virtual machine (VM) to a specific host among a pool of available hosts in a virtualized network is generally managed by a centralized entity (e.g., a placement engine). Equipped with information about the hosts' capabilities (e.g., platform architecture, available memory, processing power, etc.), the placement engine can typically determine whether a host's capabilities support a VM placement request. A list of candidate hosts may be compiled by the placement engine as a placement solution; and one of the candidate hosts may be selected to deploy the VM.

Utilization of a centralized placement engine, in addition to having a single point of failure, requires continuous updates to determine the hosts' available capacity. Such centralized approach is not scalable in a network with thousands of hosts, nor is it practical for large data centers where there are highly dynamic resource requirements for multitudes of VM requests generated around the clock. Particularly, in a hierarchical placement approach, placement can be complex to manage as placement decisions are difficult to decompose across the hierarchy.

Furthermore, in case of utilization of multiple concurrent schedulers, possible race conditions might result in placement failures. Further, in a fully distributed placement model, where placement decisions are made at the host level, the bandwidth usage over the network can be overly consumed by the generated placement request/reply traffic. A more scalable and efficient system for managing VM placement in a virtualized computing environment is desirable.

SUMMARY

For purposes of summarizing, certain aspects, advantages, and novel features have been described herein. It is to be understood that not all such advantages may be achieved in accordance with any one particular embodiment. Thus, the disclosed subject matter may be embodied or carried out in a manner that achieves or optimizes one advantage or group of advantages without achieving all advantages as may be taught or suggested herein.

In accordance with one embodiment, a computer implemented method for deploying virtual machines (VMs) comprises: maintaining N message queues corresponding to N VM flavors, wherein the N VM flavors are associated with N distinguishable configuration requirements for supporting placement of at least a first VM on at least a first host with limited resources; wherein a first host from among a plurality of hosts subscribes to a first message queue from among the N message queues, in response to determining that the first host has the resources that match the respective configuration requirements for supporting the first VM request placed on the first message queue; receiving a VM placement request for the first VM, wherein the VM placement request comprises information indicating a first VM flavor associated with a first message queue; communicating arrival of the VM request to one or more hosts subscribing to the first message queue; and forwarding the VM placement request to a responding host to deploy the VM.

In accordance with one or more embodiments, a system comprising one or more logic units is provided. The one or more logic units are configured to perform the functions and operations associated with the above-disclosed methods. In yet another embodiment, a computer program product comprising a computer readable storage medium having a computer readable program is provided. The computer readable program when executed on a computer causes the computer to perform the functions and operations associated with the above-disclosed methods.

One or more of the above-disclosed embodiments in addition to certain alternatives are provided in further detail below with reference to the attached figures. The disclosed subject matter is not, however, limited to any particular embodiment disclosed.

BRIEF DESCRIPTION OF THE DRAWINGS

The disclosed embodiments may be better understood by referring to the figures in the attached drawings, as provided below.

Features, elements, and aspects that are referenced by the same numerals in different figures represent the same, equivalent, or similar features, elements, or aspects, in accordance with one or more embodiments.

DETAILED DESCRIPTION OF EXAMPLE EMBODIMENTS

In the following, numerous specific details are set forth to provide a thorough description of various embodiments. Certain embodiments may be practiced without these specific details or with some variations in detail. In some instances, certain features are described in less detail so as not to obscure other aspects. The level of detail associated with each of the elements or features should not be construed to qualify the novelty or importance of one feature over the others.

Figure 1:
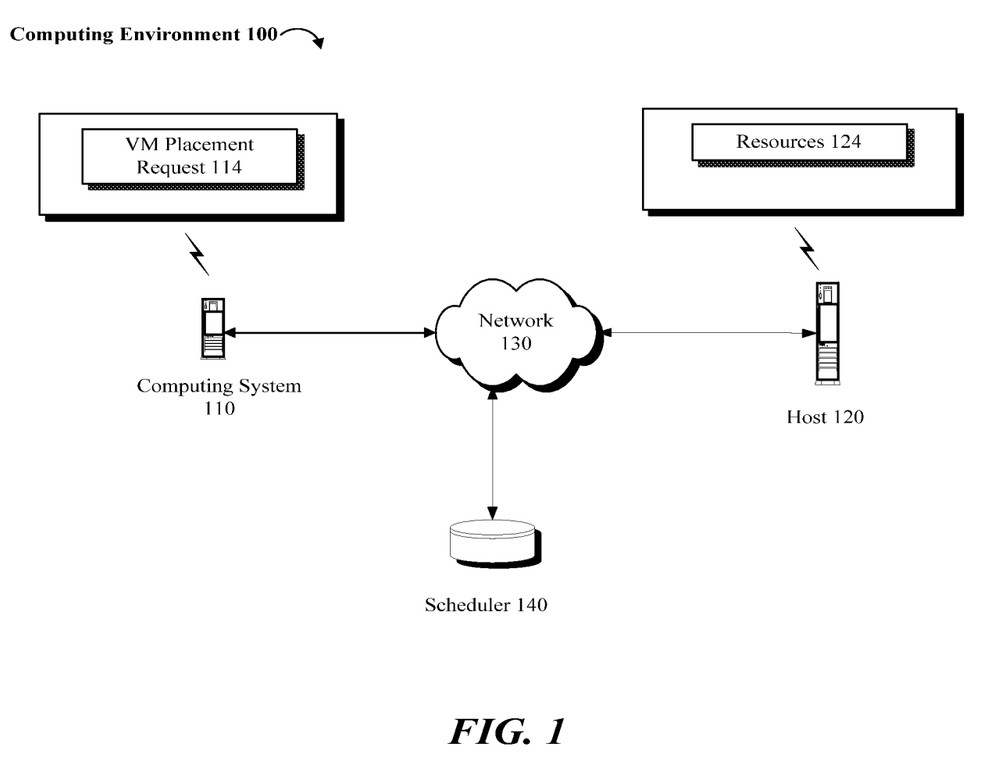
FIG. 1 illustrates a computing environment for managing placement of one or more VMs, in accordance with one or more embodiments.

Referring to FIG. 1, in accordance with one or more embodiments, a computing environment 100 is provided in which a computing system 110 is in communication with one or more hosts over network 130 by way of a scheduler 140. As provided in further detail below, scheduler 140 acts as an intermediary management system, such that resources 124 on a host 120 may be allocated for the deployment of a VM, in response to receiving a VM placement request 114 from computing system 110.

Depending on implementation, one or more message queues (not shown) may be provided such that a first message queue corresponds to a first set of hosts, and a second message queue corresponds to a second set of hosts, and so on. As such, scheduler 140 may manage a pool of hosts. New hosts may be introduced to the pool, and existing hosts in the pool may be removed from the pool for purposes such as upgrading or maintenance A host 120 may be identified as associated with a certain discrete set of resources (i.e., "flavor"). Hosts associated with the same flavor may be determined as having same or similar computing capabilities, such as architecture platform, processing power, hardware specifications, etc.

Depending on implementation, a host 120 (or scheduler 140) may determine, desirably in real-time, the host's level of available resources, such as virtual processor (vCPU) availability, memory (e.g., RAM) usage, disk capacity, and possible over-commitment to VM placement requests. Further, a computing system 110 may determine configuration requirements for a VM based on a VM placement request 114. The VM placement request 114, for example, may specify that to support the VM, a host needs to have certain level or specification of resources (e.g., a certain type of architecture, a certain number of CPUs, and a certain amount of RAM, etc.).

Accordingly, VM deployment requirements for a VM may be discrete and distinguishable configurations and associated with VM flavor (e.g., a VM instance type). In some implementations, a catalogue of VM flavors typically may be defined by an administrative entity or a set of tenants with specific requirements. The number of VM flavors in the catalogue for network 130 may be finite (e.g., defined in the order of tens). A new VM flavor may be added to the catalogue and an existing VM may be deleted from the catalogue. The composition of the VM flavor catalogue may change at a lower frequency compared to the frequency at which VMs may be provisioned over network 130.

Figure 2:
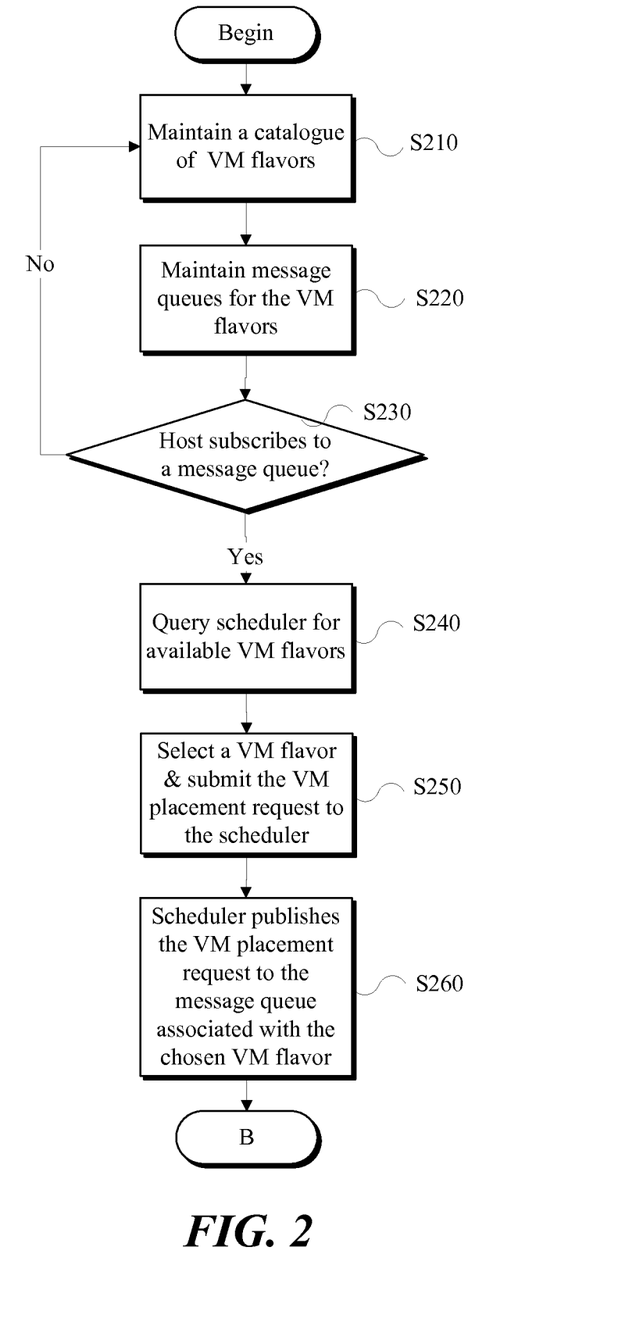
FIGS. 2 and 3 illustrate exemplary methods for managing placement of one or more VMs, in accordance with one or more embodiments.

Referring to the FIG. 2, in one embodiment, a catalogue of N VM flavors may be maintained for the purposes of deploying one or more VMs over network 130 (S210). N message queues may be maintained to correspond to the N VM flavors in the catalogue (S220). For a VM flavor in the catalogue, a message queue may be set up so that one message queue may correspond to one VM flavor in the catalogue, and one VM flavor in the catalogue may be associated with one message queue. For the N message queues maintained, a host 120 from among the pool of hosts in network 130 may determine whether to subscribe to at least one message queue associated with one flavor (S230). If a new host is added, the new host may also determine to which message queues to subscribe.

A host 120 may decide to subscribe to a message queue, in response to determining that the host has sufficient resources 124 that match the respective configuration requirements set forth in the VM flavor associated with the message queue. For example, a host 120 may subscribe to one or more message queues based on both the resource capabilities (e.g., CPU power, CPU architecture, etc.) and the resource capacity (e.g., vCPUs, RAM, disk usage, etc.) on the host 120. In other words, a host 120 may subscribe to a message queue associated with a VM flavor that matches the host's computational capabilities at a given point in time. As provided in further detail below, when a host 120 subscribes to a message queue, a host may receive and service a VM placement request placed on the message queue by scheduler 130.

According to a simplified example, a first flavor may be associated with a host that has resources or capabilities to support the deployment of a VM that needs at least two processors and 10 GB of memory. After the association between the host and the first flavor is established, the capabilities or attributes of the host may change (e.g., due to changes in available resources for the host after deploying another VM or after removing a previously deployed VM). If so, then the host may update its association to match other VM flavors which would be a match (or a better match) to the host's new attributes. In this manner, a host may subscribe to message queues associated with flavors with specifications that are supported by the host.

Referring back to FIG. 2, when a new VM flavor is added to the catalogue of VM flavors, a corresponding message queue may be created for the new VM flavor, and the hosts in network 130 may be notified to determine whether to subscribe to the newly created message queue for the new VM flavor (S230). Several methods may be utilized to allow hosts to update their subscription to the new message queue. For example, one may use a centralized server to provide the entire list of available VM flavors and periodic polling from the hosts. Another approach may leverage a distributed messaging system and use a specific publish/subscribe topic to optionally immediately push new VM flavor announcements to the hosts. In order to mitigate the effects of possible non-delivered notifications, intermittent messages including a list of available VM flavors may be published.

In one exemplary embodiment, before submitting a VM placement request, computing system 110 may query scheduler 140 to obtain the list of VM flavors that are available (S240). The scheduler 140 may respond by providing computing system 110 with the catalogue of the VM flavors available. It is noteworthy that the catalogue of VM flavors may be updated as new VM flavors may be added to or deleted from the catalogue. Further, the catalogue may be updated as the availability of resources for the subscribing hosts may change, resulting in certain VM flavors not being available, or new flavors becoming available.

Upon receiving the catalogue of the VM flavors, the computing system 110 may choose a VM flavor that matches the configuration requirements of the VM placement request and submit the VM placement request, including information indicating the chosen VM flavor (S250). In a simplified example, a message queue subscription model may involve the scheduler receiving VM placement requests and placing the requests on different message queues according to the VM flavor of the message queue with which a VM placement request is associated (S260). For example, a request for placement of a first VM may be associated with a first VM flavor. Upon receiving the VM placement request, the scheduler 140 places the request on a first message queue corresponding with the first VM flavor.

Figure 3:
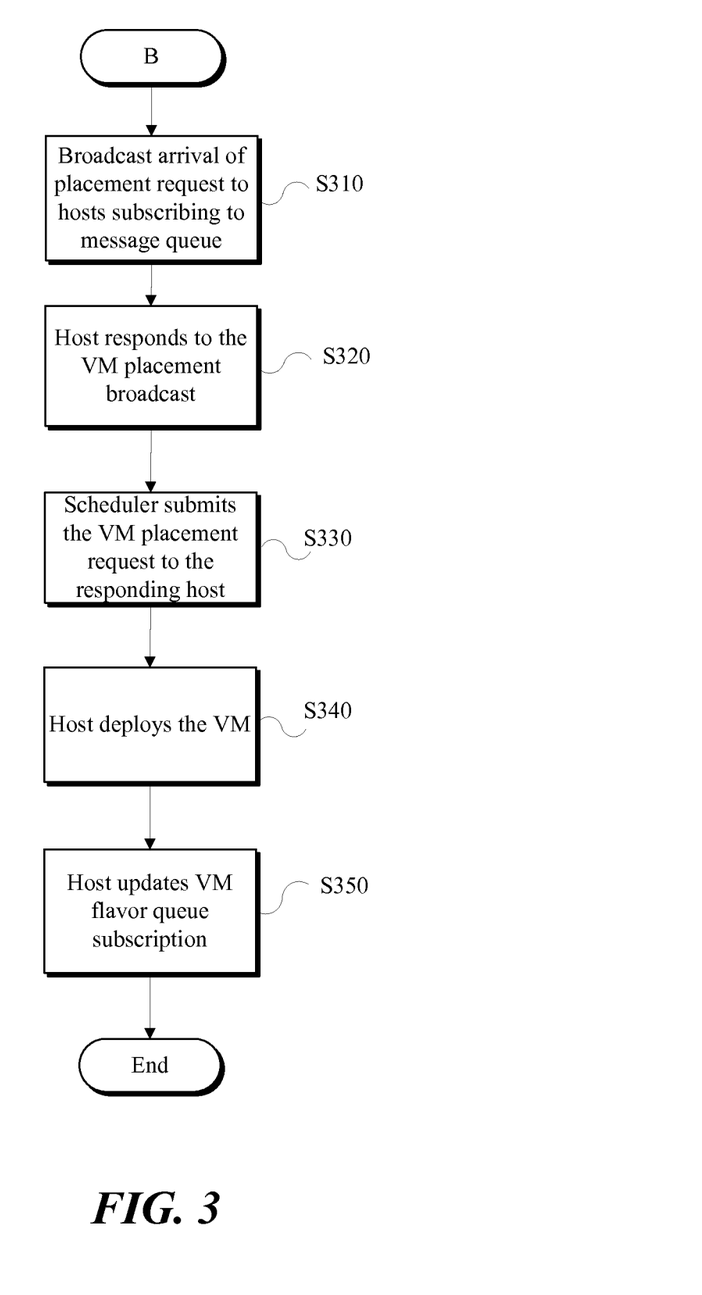

Referring to the FIG. 3, scheduler 140 may communicate the arrival of a VM placement request to the subscribing hosts of a message queue associated with the VM flavor indicated by the VM placement request (S310). In one exemplary embodiment, a first host which subscribes to the first message queue may first determine whether it may be able to successfully deploy the VM. For example, prior to committing to deploying the VM, the first host may check if the placement of the VM violates possible placement constraints of the VM to be deployed as well as the constraints of the VMs already running on the first host. Prior to committing to deploying the VM, a confirmation may be in order to determine if the first host still meets the requirements for the first VM flavor.

The confirmation referred to above is optional but is relevant and useful in a case where the host's capabilities or attributes have changed since the time of host's last subscription to the first message queue. If the first host determines that it may successfully support the VM placement request without violating any constraints or limitations, the first host may remove the VM placement request from the first message queue. As such, the first host may respond to the scheduler's 140 VM placement broadcast (S320). In response, the scheduler 140 may forward the VM placement request to the first host (S330). The first host upon receiving the placement request may deploy the respective VM (S340) and update its message queue subscription according to its then available resources (S350).

In one exemplary embodiment, the first host may reserve the resources for deploying the respective VM, and forward an indication to the scheduler 140 that the host is ready to service the VM placement request. If the scheduler 140 does not respond to the first host after a time threshold has expired, the first host may release the reserved resources and update its message queue subscriptions according to its available resources taking into account the released resources. In such a scenario, if the first host does not deploy the VM, the VM placement request may be handled by another host or re-queued. In other embodiments, message queues may be implemented so that the scheduler may choose any one of the hosts that is listening to a queue for the purpose of handling the placement request, regardless of any subscription to a certain topic or flavor, for example.

In another scenario, if the first host determines that it may not successfully support the VM placement request without violating any constraints, then the VM placement request may not be removed from the first message queue by the first host. If this scenario, if the first host removes the VM placement request from the first message queue, the VM placement request may be placed back on the first message queue so that other hosts that are subscribing to the first message queue may be able to service the VM placement request. In a scenario where no hosts subscribing to the first message queue may be able to support the deployment of the VM with the first VM flavor, the VM placement request may remain in the first message queue, or may be rejected.

Depending on implementation, a merit-based model may be utilized to determine the proper assignment of a VM placement request to a host. In one example embodiment, where multiple hosts subscribe to a message queue for a particular VM flavor, a plurality of the subscribing hosts may be qualified, but certain hosts may be more suitable to service the VM placement request. In such a scenario, the hosts may be given an opportunity to compete with each other for servicing the VM placement request based on certain merits.

For example, if two hosts (host1 vs. host2) subscribe to the first message queue and the submitted VM placement request is for a host that has at least four vCPUs and 8 GB of RAM memory (e.g., matching the first VM flavor attributes), then for efficiency (i.e., optimization of network traffic) host1 may be selected over host2 to host the VM, if host1 is, for example, in closer proximity to the storage medium in which the relevant data for the subject VM is stored. Attributes or conditions other than the data storage proximity may be relevant or material to choosing between the available hosts. Such other attributes or conditions may include the processing platform or architecture, resource capacity levels, etc.

When a host supporting one or more VMs (i.e., a source host) is no longer able to support the execution of the VMs, the source host may be removed from network 130. Before a source host is removed, the source host may directly submit a VM placement request to other hosts in network 130 to migrate the VMs from the source host. The VM placement request may be implemented by placing a migration request on a message queue that matches the flavor associated with the VMs that are to be migrated. When another host (i.e., a target host) accepts the migration request, the VMs may be migrated from the source host to the target host.

The target host may update its available capacity and subscriptions after accepting the migration request. The source host may update its capacity if the migrating VM is successfully deployed on the target host. In a scenario where the migrating VM is not successfully deployed on the target host after the migration request has been accepted, the target host may restore its capacity and update message queue subscriptions accordingly. In one exemplary embodiment, when a host is involved in a VM migration process, the host's subscription to message queues are suspended till the migrating process concludes.

When a VM is removed from its source host, the source host may update its available capacity and subscriptions to the message queues according to the updated capacity. When the removed VM instance is the last instance of a VM flavor, the message queue corresponding to the VM flavor may be removed as well.

References in this specification to "an embodiment", "one embodiment", "one or more embodiments" or the like, mean that the particular element, feature, structure or characteristic being described is included in at least one embodiment of the disclosed subject matter. Occurrences of such phrases in this specification should not be particularly construed as referring to the same embodiment, nor should such phrases be interpreted as referring to embodiments that are mutually exclusive with respect to the discussed features or elements.

In different embodiments, the claimed subject matter may be implemented as a combination of both hardware and software elements, or alternatively either entirely in the form of hardware or entirely in the form of software. Further, computing systems and program software disclosed herein may comprise a controlled computing environment that may be presented in terms of hardware components or logic code executed to perform methods and processes that achieve the results contemplated herein. Said methods and processes, when performed by a general purpose computing system or machine, convert the general purpose machine to a specific purpose machine.

Figure 4A:
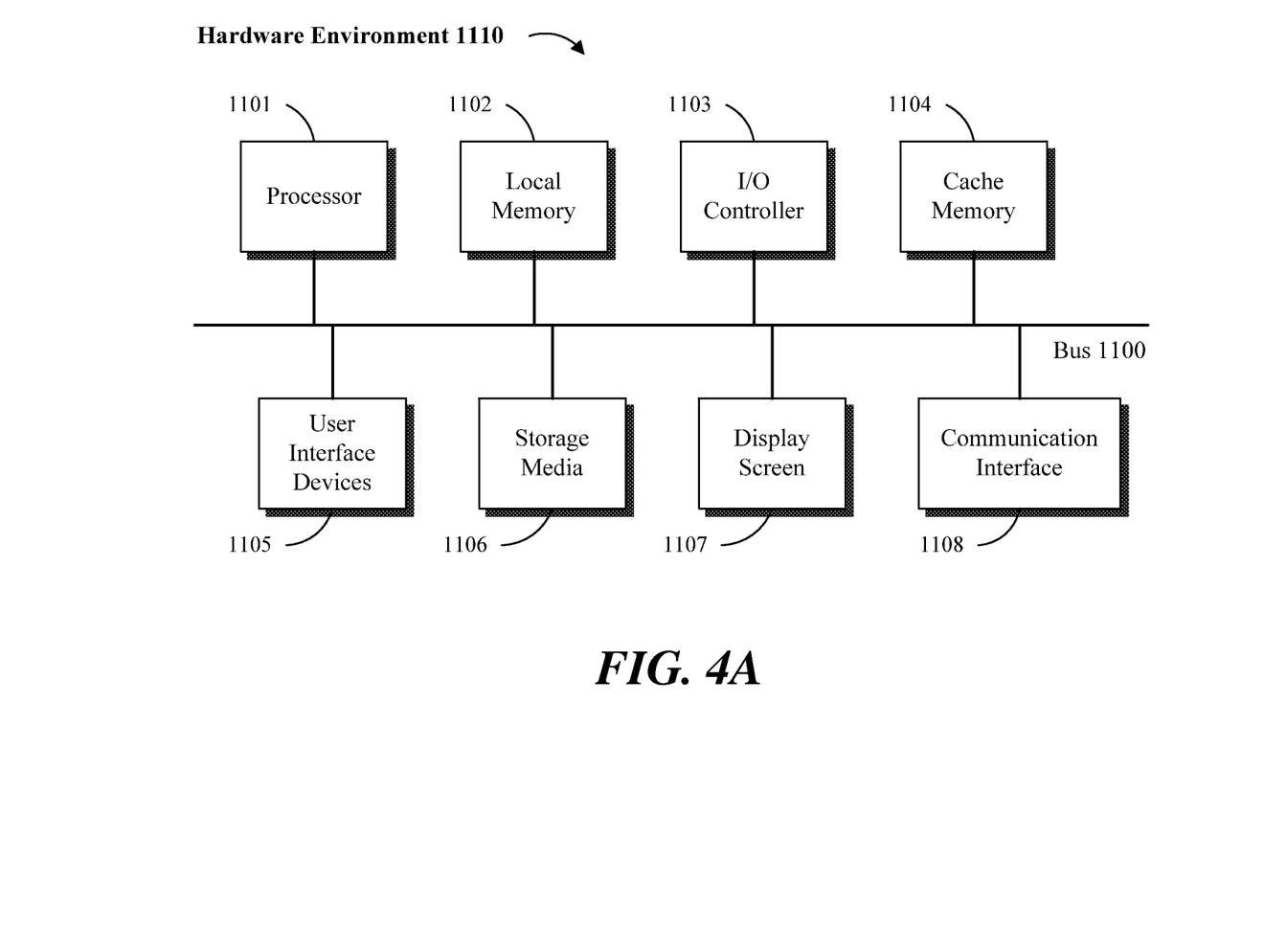
FIGS. 4A and 4B are block diagrams of hardware and software environments in which the disclosed systems and methods may operate, in accordance with one or more embodiments.
Figure 4B:
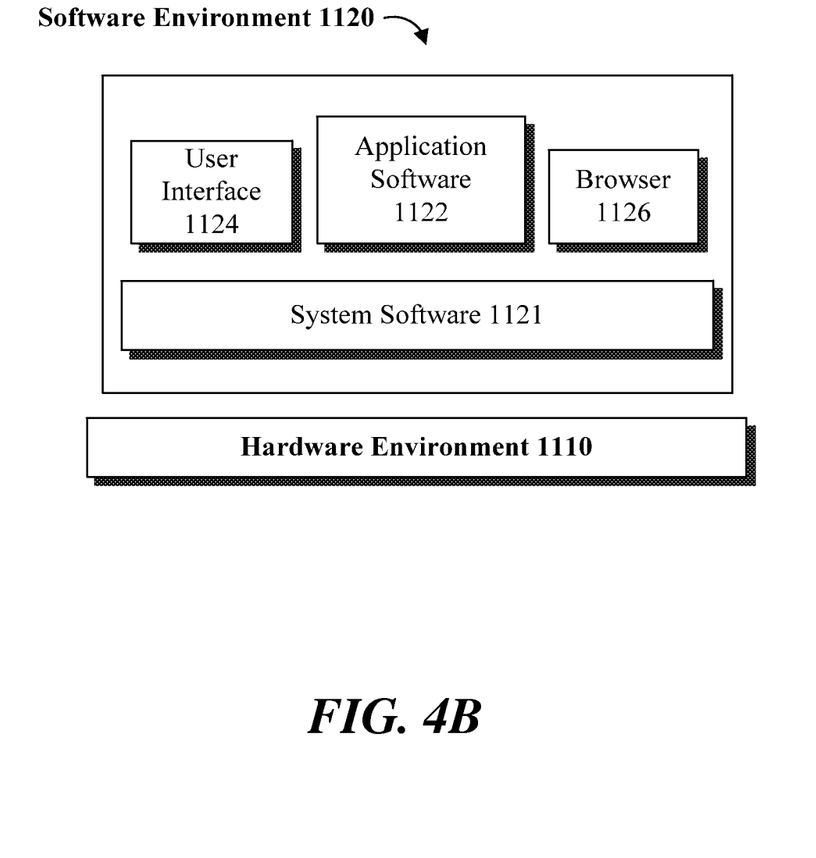

Referring to FIGS. 4A and 4B, a computing system environment in accordance with an exemplary embodiment may be composed of a hardware environment 1110 and a software environment 1120. The hardware environment 1110 may comprise logic units, circuits or other machinery and equipments that provide an execution environment for the components of software environment 1120. In turn, the software environment 1120 may provide the execution instructions, including the underlying operational settings and configurations, for the various components of hardware environment 1110.

Referring to FIG. 4A, the application software and logic code disclosed herein may be implemented in the form of machine readable code executed over one or more computing systems represented by the exemplary hardware environment 1110. As illustrated, hardware environment 110 may comprise a processor 1101 coupled to one or more storage elements by way of a system bus 1100. The storage elements, for example, may comprise local memory 1102, storage media 1106, cache memory 1104 or other machine-usable or computer readable media. Within the context of this disclosure, a machine usable or computer readable storage medium may include any recordable article that may be utilized to contain, store, communicate, propagate or transport program code.

A computer readable storage medium may be an electronic, magnetic, optical, electromagnetic, infrared, or semiconductor medium, system, apparatus or device. The computer readable storage medium may also be implemented in a propagation medium, without limitation, to the extent that such implementation is deemed statutory subject matter. Examples of a computer readable storage medium may include a semiconductor or solid-state memory, magnetic tape, a removable computer diskette, a random access memory (RAM), a read-only memory (ROM), a rigid magnetic disk, an optical disk, or a carrier wave, where appropriate. Current examples of optical disks include compact disk, read only memory (CD-ROM), compact disk read/write (CD-R/W), digital video disk (DVD), high definition video disk (HD-DVD) or Blue-Ray™ disk.

In one embodiment, processor 1101 loads executable code from storage media 1106 to local memory 1102. Cache memory 1104 optimizes processing time by providing temporary storage that helps reduce the number of times code is loaded for execution. One or more user interface devices 1105 (e.g., keyboard, pointing device, etc.) and a display screen 1107 may be coupled to the other elements in the hardware environment 1110 either directly or through an intervening I/O controller 1103, for example. A communication interface unit 1108, such as a network adapter, may be provided to enable the hardware environment 1110 to communicate with local or remotely located computing systems, printers and storage devices via intervening private or public networks (e.g., the Internet). Wired or wireless modems and Ethernet cards are a few of the exemplary types of network adapters.

It is noteworthy that hardware environment 1110, in certain implementations, may not include some or all the above components, or may comprise additional components to provide supplemental functionality or utility. Depending on the contemplated use and configuration, hardware environment 1110 may be a machine such as a desktop or a laptop computer, or other computing device optionally embodied in an embedded system such as a set-top box, a personal digital assistant (PDA), a personal media player, a mobile communication unit (e.g., a wireless phone), or other similar hardware platforms that have information processing or data storage capabilities.

In some embodiments, communication interface 1108 acts as a data communication port to provide means of communication with one or more computing systems by sending and receiving digital, electrical, electromagnetic or optical signals that carry analog or digital data streams representing various types of information, including program code. The communication may be established by way of a local or a remote network, or alternatively by way of transmission over the air or other medium, including without limitation propagation over a carrier wave.

As provided here, the disclosed software elements that are executed on the illustrated hardware elements are defined according to logical or functional relationships that are exemplary in nature. It should be noted, however, that the respective methods that are implemented by way of said exemplary software elements may be also encoded in said hardware elements by way of configured and programmed processors, application specific integrated circuits (ASICs), field programmable gate arrays (FPGAs) and digital signal processors (DSPs), for example.

Referring to FIG. 4B, software environment 1120 may be generally divided into two classes comprising system software 1121 and application software 1122 as executed on one or more hardware environments 1110. In one embodiment, the methods and processes disclosed here may be implemented as system software 1121, application software 1122, or a combination thereof. System software 1121 may comprise control programs, such as an operating system (OS) or an information management system, that instruct one or more processors 1101 (e.g., microcontrollers) in the hardware environment 1110 on how to function and process information. Application software 1122 may comprise but is not limited to program code, data structures, firmware, resident software, microcode or any other form of information or routine that may be read, analyzed or executed by a processor 1101.

In other words, application software 1122 may be implemented as program code embedded in a computer program product in form of a machine-usable or computer readable storage medium that provides program code for use by, or in connection with, a machine, a computer or any instruction execution system. Moreover, application software 1122 may comprise one or more computer programs that are executed on top of system software 1121 after being loaded from storage media 1106 into local memory 1102. In a client-server architecture, application software 1122 may comprise client software and server software. For example, in one embodiment, client software may be executed on a client computing system that is distinct and separable from a server computing system on which server software is executed.

Software environment 1120 may also comprise browser software 1126 for accessing data available over local or remote computing networks. Further, software environment 1120 may comprise a user interface 1124 (e.g., a graphical user interface (GUI)) for receiving user commands and data. It is worthy to repeat that the hardware and software architectures and environments described above are for purposes of example. As such, one or more embodiments may be implemented over any type of system architecture, functional or logical platform or processing environment.

It should also be understood that the logic code, programs, modules, processes, methods and the order in which the respective processes of each method are performed are purely exemplary. Depending on implementation, the processes or any underlying sub-processes and methods may be performed in any order or concurrently, unless indicated otherwise in the present disclosure. Further, unless stated otherwise with specificity, the definition of logic code within the context of this disclosure is not related or limited to any particular programming language, and may comprise one or more modules that may be executed on one or more processors in distributed, non-distributed, single or multiprocessing environments.

As will be appreciated by one skilled in the art, a software embodiment may include firmware, resident software, micro-code, etc. Certain components including software or hardware or combining software and hardware aspects may generally be referred to herein as a "circuit," "module" or "system." Furthermore, the subject matter disclosed may be implemented as a computer program product embodied in one or more computer readable storage medium(s) having computer readable program code embodied thereon. Any combination of one or more computer readable storage medium(s) may be utilized. The computer readable storage medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing.

In the context of this document, a computer readable storage medium may be any tangible medium that can contain, or store a program for use by or in connection with an instruction execution system, apparatus, or device. A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable storage medium may be transmitted using any appropriate medium, including but not limited to wireless, wireline, optical fiber cable, RF, etc., or any suitable combination of the foregoing. Computer program code for carrying out the disclosed operations may be written in any combination of one or more programming languages, including an object oriented programming language such as Java, Smalltalk, C++ or the like and conventional procedural programming languages, such as the "C" programming language or similar programming languages.

The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Certain embodiments are disclosed with reference to flowchart illustrations or block diagrams of methods, apparatus (systems) and computer program products according to embodiments. It will be understood that each block of the flowchart illustrations or block diagrams, and combinations of blocks in the flowchart illustrations and/or block diagrams, can be implemented by computer program instructions. These computer program instructions may be provided to a processor of a general purpose computer, a special purpose machinery, or other programmable data processing apparatus to produce a machine, such that the instructions, which execute via the processor of the computer or other programmable data processing apparatus, create means for implementing the functions or acts specified in the flowchart or block diagram block or blocks.

These computer program instructions may also be stored in a computer readable storage medium that can direct a computer, other programmable data processing apparatus, or other devices to function in a particular manner, such that the instructions stored in the computer readable storage medium produce an article of manufacture including instructions which implement the function or act specified in the flowchart or block diagram block or blocks.

The computer program instructions may also be loaded onto a computer, other programmable data processing apparatus, or other devices to cause a series of operational steps to be performed on the computer, other programmable apparatus or other devices to produce a computer or machine implemented process such that the instructions which execute on the computer or other programmable apparatus provide processes for implementing the functions or acts specified in the flowchart or block diagram block or blocks.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical functions. It should also be noted that, in some alternative implementations, the functions noted in the block may occur in any order or out of the order noted in the figures.

For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, may be implemented by special purpose hardware-based systems that perform the specified functions or acts, or combinations of special purpose hardware and computer instructions.

The claimed subject matter has been provided here with reference to one or more features or embodiments. Those skilled in the art will recognize and appreciate that, despite of the detailed nature of the exemplary embodiments provided here, changes and modifications may be applied to said embodiments without limiting or departing from the generally intended scope. These and various other adaptations and combinations of the embodiments provided here are within the scope of the disclosed subject matter as defined by the claims and their full set of equivalents.

What is claimed is:

1. A computer implemented method for deploying virtual machines (VMs) over a communications network, the method comprising:

maintaining N message queues corresponding to N VM flavors, wherein the N VM flavors are associated with N distinguishable configuration requirements for supporting placement of at least a first VM on at least a first host with limited resources, and wherein each of the N message queues corresponds to only one of the N VM flavors;

wherein a first host from among a plurality of hosts subscribes to a first message queue from among the N message queues, in response to determining that the first host has the resources that match the respective configuration requirements for supporting the first VM placed on the first message queue;

receiving a VM placement request for the first VM, wherein the VM placement request comprises information indicating a first VM flavor associated with a first message queue;

communicating arrival of the VM request to one or more hosts subscribing to the first message queue; and forwarding the VM placement request to a responding host to deploy the VM.

2. The method of claim 1, wherein a first available host subscribing to the first message queue responds upon determining that the first available host has sufficient resources for deploying the first VM.

3. The method of claim 1, wherein hosts subscribing to the first message queue respond and compete on a merit-based model to become the responding host for the VM placement request.

4. The method of claim 1, wherein the first VM flavor is identified by querying a scheduler in communication with a plurality of hosts on the communication network, wherein the scheduler responds by providing a list of VM flavors.

5. The method of claim 1, wherein when a new host is added to the communications network, the new host determines to which messages queues to subscribe.

6. The method of claim 1, wherein before a source host is removed from the communications network, the source host submits, to the message queues, VM migration requests to cause the currently hosted VMs to migrate to other hosts.

7. The method of claim 1, further comprising allowing the responding host to update subscriptions to the message queues after the deployment of the VM.

8. The method of claim 6, wherein after a target host accepts a migration request, the source host and the target host update their subscriptions to the message queues.

9. The method of claim 1, wherein when a last instance of a VM with a VM flavor is removed, a message queue associated with the VM flavor is deleted.

10. The method of claim 1, wherein a first available host subscribing to the first message queue in response to determining that the first available host has sufficient resources for the VM placement request, reserves the resources on the first available host and forwards the indication to the scheduler.

11. A system for deploying virtual machines (VMs) over a communications network, the system comprising:

one or more computer processors;

one or more tangible storage devices storing program instructions for executing a method by the one or more computer processors, the instructions comprising instructions for:

maintaining N message queues corresponding to N VM flavors, wherein the N VM flavors are associated with N distinguishable configuration requirements for supporting placement of at least a first VM on at least a first host with limited resources, and wherein each of the N message queues corresponds to only one of the N VM flavors;

wherein a first host from among a plurality of hosts subscribes to a first message queue from among the N message queues, in response to determining that the first host has the resources that match the respective configuration requirements for supporting the first VM placed on the first message queue;

receiving a VM placement request for the first VM, wherein the VM placement request comprises information indicating a first VM flavor associated with a first message queue;

communicating arrival of the VM request to one or more hosts subscribing to the first message queue; and forwarding the VM placement request to a responding host to deploy the VM.

12. The system of claim 11, wherein a first available host subscribing to the first message queue responds upon determining that the first available host has sufficient resources for deploying the first VM.

13. The system of claim 11, wherein hosts subscribing to the first message queue respond and compete on a merit-based model to become the responding host for the VM placement request.

14. The system of claim 11, wherein the first VM flavor is identified by querying a scheduler in communication with a plurality of hosts on the communication network, wherein the scheduler responds by providing a list of VM flavors.

15. The system of claim 11, wherein when a new host is added to the communications network, the new host determines to which messages queues to subscribe.

16. A computer program product comprising a non-transitory computer readable storage medium having a computer readable program for deploying virtual machines (VMs) over a communications network, wherein the computer readable program when executed on a computer causes the computer to:

maintain N message queues corresponding to N VM flavors, wherein the N VM flavors are associated with N distinguishable configuration requirements for supporting placement of at least a first VM on at least a first host with limited resources, and wherein each of the N message queues corresponds to only one of the N VM flavors;

wherein a first host from among a plurality of hosts subscribes to a first message queue from among the N message queues, in response to determining that the first host has the resources that match the respective configuration requirements for supporting the first VM placed on the first message queue;

receive a VM placement request for the first VM, wherein the VM placement request comprises information indicating a first VM flavor associated with a first message queue;

communicate arrival of the VM request to one or more hosts subscribing to the first message queue; and forward the VM placement request to a responding host to deploy the VM.

17. The computer program product of claim 16, wherein a first available host subscribing to the first message queue responds upon determining that the first available host has sufficient resources for deploying the first VM.

18. The computer program product of claim 16, wherein hosts subscribing to the first message queue respond and compete on a merit-based model to become the responding host for the VM placement request.

19. The computer program product of claim 16, wherein the first VM flavor is identified by querying a scheduler in communication with a plurality of hosts on the communication network, wherein the scheduler responds by providing a list of VM flavors.

20. The computer program product of claim 16, wherein when a new host is added to the communications network, the new host determines to which messages queues to subscribe.

* * * * *